United States Patent [19]

Edmunds

[11] Patent Number: 5,129,493
[45] Date of Patent: Jul. 14, 1992

[54] DRIVE CONNECTION FOR AN ENGINE-TRANSMISSION INTERFACE

[75] Inventor: John O. Edmunds, Zionsville, Ind.
[73] Assignee: General Motors Corporation, Detroit, Mich.
[21] Appl. No.: 732,891
[22] Filed: Jul. 19, 1991
[51] Int. Cl.[5] .............................................. F16H 45/02
[52] U.S. Cl. .................................. 192/3.29; 192/3.21; 192/3.28
[58] Field of Search ............... 192/3.28, 3.32, 3.21, 192/3.29, 3.25, 3.26, 3.27; 74/720

[56] References Cited

U.S. PATENT DOCUMENTS

| | | | |
|---|---|---|---|
| 3,002,593 | 10/1961 | Black et al. | 192/3.29 |
| 3,118,524 | 1/1964 | Howard et al. | 192/3.28 X |
| 3,163,271 | 12/1964 | Hilpert | 192/3.29 X |
| 3,893,551 | 7/1975 | Ahlen | 192/3.29 X |

*Primary Examiner*—Rodney H. Bonck
*Attorney, Agent, or Firm*—Donald F. Scherer

[57] ABSTRACT

A drive connection between an engine and a torque converter and clutch assembly has a pair of splined members. One spline member is secured to the input shell of the torque converter and the other spline member is secured to the engine. The clutch is operable to connect the engine to the output of the torque converter at a position which, in part, bypasses the spline connection and reduces or eliminates the torque load on the spline connection.

1 Claim, 1 Drawing Sheet

DRIVE CONNECTION FOR AN ENGINE-TRANSMISSION INTERFACE

BACKGROUND OF THE INVENTION

This invention relates to drive connections between an engine and a power transmission, and more particularly, to such drive connections having a pair of meshing spline members incorporated therein.

From a manufacturing standpoint, splined or toothed drive connections are the most efficient. Generally, such connections will permit the components to be placed in drive relation by sliding them together at assembly. When one of the components is an internal combustion engine, the spline connection has transient torque loads imposed thereon. These loads can cause premature spline wear and noise within the drive system. As a result, many manufacturers have resorted to threaded fasteners to provide the drive connection. This results in increased assembly costs.

SUMMARY OF THE INVENTION

It is an object of this invention to provide an improved spline drive connection incorporated between an engine and transmission, wherein during one mode of operation, the torque transmission via the spline drive is substantially reduced to a value less than the engine torque.

It is another object of this invention to provide an improved spline connection between an engine and a transmission, wherein the transmission has a torque converter impeller downstream of the spline connection and a torque converter clutch selectively connectible upstream of the spline connection, whereby engine power bypasses the torque converter spline drive when the clutch is connected.

It is a further object of this invention to provide an improved drive connection between an engine and a transmission, wherein the input torque from the engine to a torque converter passes through a spline connection, and wherein the input torque to a torque converter clutch bypasses the spline connection.

These and other advantages of the present invention will be more apparent from the following description and drawings.

DESCRIPTION OF THE DRAWINGS

The single drawing is a partial sectional elevational view depicting a drive connection between an engine and a transmission.

DESCRIPTION OF THE PREFERRED EMBODIMENT

Figure 1:
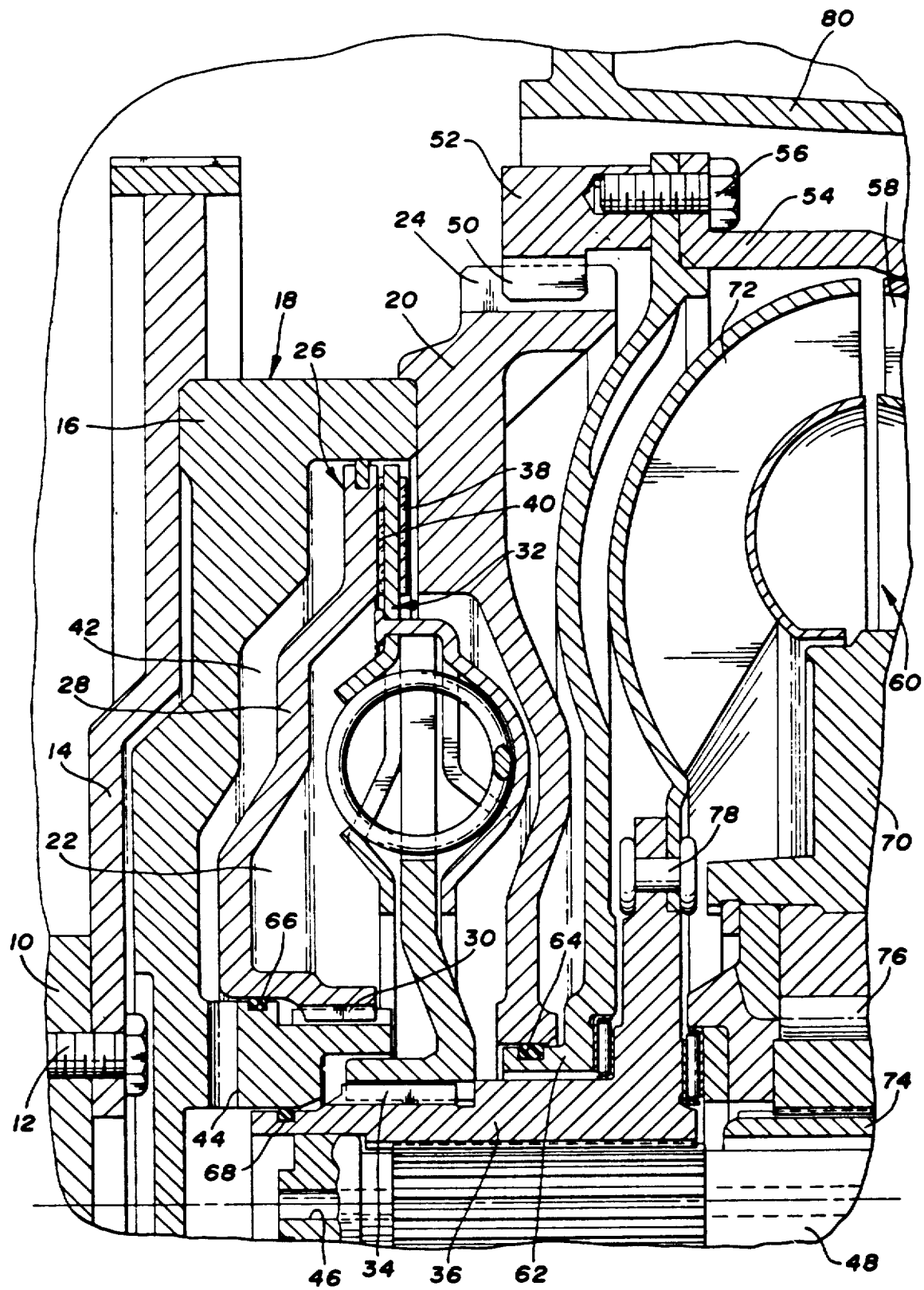

Referring to the drawing, there is seen an engine crankshaft or output shaft 10 which is a component in a conventional internal combustion engine, not shown. The crankshaft 10 is connected by a plurality of fasteners, such as 12, to a flex plate or flywheel 14, which in turn is secured to a housing member 16 of a clutch housing, generally designated 18. The clutch housing 18 further includes a second housing member 20 secured to the housing member 16 to provide a clutch chamber 22. The housing member 20 has formed on the outer periphery thereof a spline portion 24.

A torque converter clutch assembly, generally designated 26, is disposed in the clutch chamber 22 and includes a pressure plate 28 slidably disposed on the housing member 16 and also drivingly connected therewith at a spline connection, generally designated 30. The torque converter clutch assembly 26 also includes a conventional clutch plate and a damper assembly 32, which is drivingly connected at a spline connection 34 with a torque converter output hub 36.

The clutch and damper assembly 32 has a pair of friction faces 38 and 40 disposed for frictional engagement with the housing member 20 and pressure plate 28, respectively, when fluid pressure is admitted to a chamber 42 formed by the housing member 16 and the pressure plate 28. Fluid pressure is admitted to the chamber 42 through a passage 44, which in turn is supplied by a fluid passage 46 formed in a turbine shaft 48. Fluid pressure is admitted and exhausted selectively to the chamber 42 utilizing any of the well known torque converter clutch control systems designed for such purposes.

The spline 24 is drivingly connected with a spline 50 formed on a ring 52 which is secured in assembly with an input shell 54 by a plurality of fasteners 56. The input shell 54 has formed thereon or otherwise secured thereto a conventional torque converter impeller 58 which is a member of a conventional fluid torque converter, generally designated 60. The input shell 54 has an inner hub portion 62 on which is disposed a seal 64 in sealing arrangement with the housing member 20 to prevent fluid leakage to atmosphere. Annular seals 66 and 68 disposed between pressure plate 28 and housing member 16 and housing member 16 and hub 36, respectively, also control fluid leakage within the system.

The fluid torque converter 60 includes a conventional stator 70 and a conventional turbine 72. The stator 70 is connectible to a grounded stator shaft 74 through a conventional one-way device 76 in a well known manner. The turbine 72 is secured with the hub 36 by a plurality of rivets 78. The torque converter 60 and torque converter clutch assembly 26 are housed within a transmission case 80 which is secured to the engine.

When the engine is transmitting torque via the crankshaft 10 and the torque converter clutch assembly 26 is disengaged, all of the engine torque will pass through the splines 24 and 50 for delivery to the impeller 58. In a well known manner, the engine torque and power is directed from the impeller 52 to the turbine 72 and thence to the turbine shaft 48.

As is well known, internal combustion engines do not provide a smooth and consistent torque level. The engine torque output is comprised of a plurality of torque pulses which can vary widely in amplitude thereby imposing vibratory loads between the splines 24 and 50. A conventional spline connection, similar to splines 24 and 50, usually occurs between flywheel 14 and housing 16. The vibratory or transient torque loading will cause wear to occur between a conventional spline connection when the engine torque is being continuously transmitted through this connection.

With the present invention, the wear between splines 24 and 52 will be reduced to a minimum or eliminated completely. Power will be transmitted through splines 24 and 50 only until torque converter clutch assembly 26 is engaged. When the torque converter clutch assembly 26 is engaged, the engine torque and power is transmitted through the flex plate 14 and housing 18 to the clutch plate and damper assembly 32 from which it is transmitted directly to the hub 36 and turbine shaft 48.

When the torque converter clutch assembly 26 is engaged, the power transmitted via splines 24 and 50 is either bypassed completely or reduced to a very minimum amount. This clearly increases the life of the spline 24 and 50. From a power flow standpoint, the torque converter 60 is downstream from the spline connection provided by splines 24 and 50, while the torque converter clutch assembly 26 is upstream thereof. Thus, the power from the engine does not flow through the spline connection provided by the splines 24 and 50 when transmitted by the torque converter clutch assembly 26.

Since it is well known that a torque converter clutch can be engaged at relatively low engine speeds, this invention will reduce spline wear between the engine and torque converter while retaining the assembly efficiency of a spline drive.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A torque transmitting drive connection in power flow path relation between an engine and a transmission comprising: a spline drive connection; a torque converter continuous connected with the engine and disposed in one power flow path downstream of said spline drive whereby all power transmitted to the torque converter is transmitted through said spline drive; and selectively engageable torque converter clutch means for transmitting power in bypass relation with said torque converter and being disposed in another power flow path upstream of said spline drive whereby the power transmitted to the torque converter clutch means bypasses the spline drive.

* * * * *